3,776,888
CARBOXY POLY(VINYL BENZAL)RESINS
John A. Mattor, Bar Mills, Maine, assignor to Scott
Paper Company, Delaware County, Pa.
No Drawing. Continuation-in-part of application Ser. No.
180,104, Sept. 13, 1971. This application Dec. 26, 1972,
Ser. No. 318,014
Int. Cl. C08f 27/18; C08g 11/00
U.S. Cl. 260—73 R         8 Claims

ABSTRACT OF THE DISCLOSURE

Disclosed are carboxy poly(vinyl benzal) resins useful as binders in combination with lithographic diazo compounds.

RELATED APPLICATIONS

This application is a continuation-in-part of the now abandoned Ser. No. 180,104, filed Sept. 13, 1971.

BACKGROUND OF THE INVENTION

Field of the invention

This invention relates to carboxylated cyclic acetals of poly(vinyl alcohol) and more particularly to carboxy poly(vinyl benzal) resins.

Description of the prior art

Workers in the lithographic art have been seeking a resinous binder for lithographic diazo compounds which would improve the strength and durability of the photosensitive layer of lithographic printing plates. The approach of incorporating a resinous binder with the photosensitive compound has been hitherto regarded as unsuccessful. See U.S. Pat. No. 3,136,637 at column 2, lines 3 through 21 which reports that such plates are difficult to manufacture because of solubility problems and that the press life of such plates is little, if any, greater than conventional plates. Some reasons for this lack of success are that the resin must be extremely hard and tough—harder and tougher than the diazo in order to constitute an improvement—and it must have outstanding adhesion to the substrate.

SUMMARY OF THE INVENTION

Accordingly, it is an object of the present invention to provide a new resinous binder which is strong and durable when formed into a film.

A further object of this invention is to provide a new resinous binder for use in lithographic printing plates.

The present invention fulfills the above-described need which exists in the art by providing resins which form tough, hard films and which are useful for coating a variety of substrates.

More particularly, the present inventor has discovered resinous cyclic acetals of poly(vinyl alcohol) comprising recurring units according to the general formula

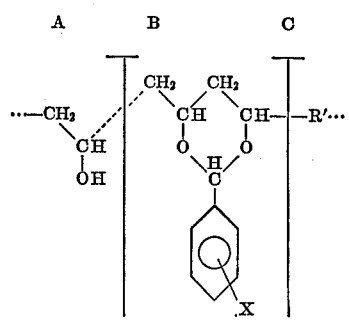

wherein X represents mono- or polysubstitution with one or more substituents taken from the group consisting of chloro, bromo and nitro and R' consists of a carboxyl-containing copolymerizable moiety and the polymer chain consists of 17 to 65 mole percent of the group labelled A and up to 16 mole percent of the group labelled C, the remainder being the group labelled B. These resins are extremely hard and tough and, when utilized in a lithographic printing plate, provide a plate of outstanding press life.

The carboxylated poly(vinyl benzal) resins of the present invention are prepared by hydrolyzing a copolymer of a vinyl ester and an unsaturated carboxylic acid followed by acetalation of the resulting alcohol with a benzaldehyde. The copolymers of vinyl esters are prepared by polymerizing a vinyl ester such as vinyl acetate with unsaturated carboxylic acids such as acrylic, crotonic, methacrylic itaconic or maleic acid. The condensation of the hydrolyzed poly(vinyl acetate), or poly(vinyl alcohol), with the aldehyde is carried out in a suitable solvent in the presence of a small amount of a mineral acid such as hydrochloric acid as the catalyst. The resulting acetalation product is then neutralized, isolated, washed and dried using standard procedures which are described in greater detail hereinafter. A highly preferred resin results from the condensation of 5 mole percent carboxylated poly(vinyl alcohol), 5% by weight crotonic acid based upon the weight of the copolymer of crotonic acid and vinyl acetate, and 4-chlorobenzaldehyde, with about 20 to 24% by weight calculated as poly(vinyl alcohol) of the hydroxyls remaining unsubstituted.

|  | A (vinyl alcohol) | B (acetal) | C (crotonic acid) |
| --- | --- | --- | --- |
|  | Composition of polymer before Acetal Formation | | |
| Weight percent | 90.6 | 0 | 9.4 |
| Mole percent | 95 | 0 | 5 |
| At 20% residual hydroxyl: | Composition of Polymer after Acetal Formation | | |
| Weight percent | 20 | 74.7 | 5.3 |
| Mole percent | 52.1 | 40.8 | 7.1 |
| At 24% residual hydroxyl: | | | |
| Weight percent | 24.0 | 70.5 | 5.5 |
| Mole percent | 57.7 | 35.5 | 6.8 |

PREPARATION OF THE CARBOXYLATED RESIN

Two basic ways of preparing a poly(vinyl acetal) resin are (1) to react a suspension of fine-particle poly(vinyl alcohol) in an organic solvent with the aldehyde, using an acid catalyst resulting in complete solution and (2) to react an aldehyde with an aqueous solution of poly(vinyl alcohol), resulting in a precipitate of the resin. In the second method, the precipitation may be retarded or suppressed completely by adding a solvent along with the aldehyde, such as 2-methoxyethanol or methanol, thus improving the degree of substitution attained. This is illustrated in the following two-step reaction in which a carboxy poly(vinyl alcohol) is prepared from a copolymer of crotonic acid and vinyl acetate wherein the crotonic acid comprises 5% by weight of the copolymer followed by acetal formation of the carboxy poly(vinyl alcohol) by condensation with 4-chlorobenzaldehyde.

Step 1.—Preparation of carboxy poly(vinyl alcohol) from carboxy poly(vinyl acetate)

Materials:
    Crotonic acid-vinyl acetate
        copolymer _____ 50 g.
    Methanol _____ 500 ml.
    Sodium _____ 1 g. in 20 ml. methanol.

Procedure.—The copolymer was dissolved in the methanol and brought to gentle reflux. The sodium methoxide catalyst was added, and reflux continued for 30 minutes. The product precipitated as a fine flake and was filtered and rinsed with methanol. The methanol-wet cake weighed 150 g.

As will be readily understood by one familiar with this art, traces of the vinyl ester function may be found in the form of poly(vinyl acetate) in the precipitated product. The presence of the residual ester function is of so little consequence that, if the teachings of the present invention are followed, it can be ignored. For the purpose of this disclosure, the material is regarded as fully hydrolyzed.

Step 2.—Preparation of carboxy poly(4-chlorobenzal) resin

Materials:
    Methanol-wet cake of carboxy
      poly(vinyl alcohol) from
      Step 1, 9.4% by weight cro-
      tonic acid moiety_____ 150 g.
    Water _____ 250 ml.
    4-chlorobenzaldehyde _____ 32 g.
    2 - methoxyethanol (methyl
      Cellosolve) _____ 100 ml.
    Sulfuric acid _____ 5 ml. in 20 ml. $H_2O$.

Procedure.—The poly(vinyl alcohol) cake was dissolved in water and brought to reflux in a well-stirred one-liter vessel. The diluted sulfuric acid was added, then the 4-chlorobenzaldehyde in 2-methoxyethanol. Within fifteen minutes a large mass of polymer formed. The reaction was continued for 1.5 hours, the liquid phase decanted, and the polymer mass washed with water.

The impure polymer was purified by dissolving it in 500 ml. of 2-methoxyethanol and mixing it with a total of two liters of 3% sodium bisulfite solution. The product was thoroughly washed with water and air-dried at room temperature. The resin had 24% by weight residual hydroxyl content calculated as poly(vinyl alcohol) or, expressed in terms of the general formula 57.7 mole percent of A.

Acids other than crotonic could be copolymerized with vinyl acetate, such as acrylic, methacrylic, itaconic or maleic acids. Alternately, a carboxy aldehyde can be employed as a minor component during acetal formation, condensing it with a non-carboxylated poly(vinyl alcohol).

The interchangeability of substitution of chloro, bromo and nitro on the benzene ring in poly(vinyl alcohol) polymer chemistry is well known, as indicated for example by U.S. Pat. 3,637,394. Illustrative of benzaldehydes which can be used in place of 4-chlorobenzaldehyde in Step 2 are 2-chlorobenzaldehyde, 3,4-dichlorobenzaldehyde, 4-bromo benzaldehyde and 3-nitrobenzaldehyde.

The cyclic acetal of the present invention is insoluble in water but soluble in a wide range of organic solvents. When combined with a solvent-soluble negative-working diazo it forms a photopolymer which is negative-working. Light causes crosslinking between the diazo and the cyclic acetal and hence isolubilizes the polymer. When utilized in a photolithographic printing plate, this photopolymer is rendered insoluble by exposure to light which passes through the transparent areas of an original or master transparency. In the unexposed portions of the plate, the soluble photopolymer is removed by the application of a suitable solvent for the polymer.

When this photopolymer is employed in a photolithographic printing plate, it provides an image which is highly resistant to wear and which firmly bonds to a widely-used support for lithographic printing plates, namely aluminum, and particularly anodized aluminum.

The carboxy poly(vinyl-4-chlorobenzal), when used as a binder for planographic coatings, possesses better photopolymerization properties than closely related compounds, such as carboxy poly(vinyl-2-chlorobenzal). This cyclic acetal also shows substantially greater adherence to aluminum than uncarboxylated poly(vinyl-4-chlorobenzal). Lithographic printing plates prepared employing the carboxy poly(vinyl-4-chlorobenzal) resin exhibit exceptional run length.

While the invention has been particularly described with reference to preferred embodiments thereof, it is understood that various other changes and modifications thereof will occur to a person skilled in the art without departing from the spirit and scope of the invention as defined by the appended claims.

What is claimed is:

1. Resinous cyclic acetals of poly(vinyl alcohol) consisting essentially of the repeating units of the general formula

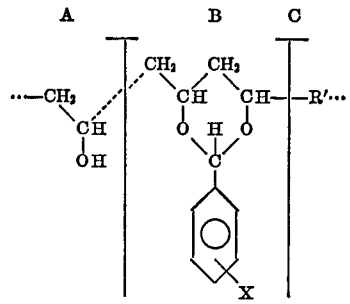

wherein X represents mono- or polysubstitution with one or more substituents taken from the group consisting of chloro, bromo and nitro, wherein R' is a carboxyl-containing copolymerizable unit derived from an unsaturated mono- or di-carboxylic acid and the polymer chain consists of 17–65 mole percent of the group labelled A and up to 16 mole percent of the group labelled C, the remainder being the group labelled B.

2. Cyclic acetals according to claim 1 wherein R' is a unit derived from an unsaturated mono carboxylic acid.

3. Cyclic acetals according to claim 2 wherein R' is a unit derived from acrylic, crotonic or methacrylic acid.

4. Cyclic acetals according to claim 1 wherein R' is a crotonic acid unit.

5. A cyclic acetal according to claim 4, wherein X is 2-chloro, 4-chloro, 3,4-dichloro, 4-bromo, or 3-nitro.

6. A cyclic acetal according to claim 5 wherein X is 4-chloro.

7. Cyclic acetals according to claim 1, wherein R' is a unit derived from an unsaturated di-carboxylic acid.

8. Cyclic acetals according to claim 6, wherein R' is a unit derived from itaconic or maleic acid.

No references cited.

WILLIAM H. SHORT, Primary Examiner

L. M. PHYNES, Assistant Examiner

U.S. Cl. X.R.

96—88; 260—29.6 BE, 78.5 BB, E & Cl, 88.3 A, 91.3 VA